O. EDWARDS.

Skates.

No. 6,676. Reissued Oct. 5, 1875.

WITNESSES

E. F. Nottingham.

Wm. H. Brereton Jr.

By Leggett & Leggett Attorneys.

INVENTOR

Oliver Edwards.

N. PETERS, PHOTO-LITHOGRAPHER, WASHINGTON, D. C.

UNITED STATES PATENT OFFICE.

OLIVER EDWARDS, OF FLORENCE, MASSACHUSETTS.

IMPROVEMENT IN SKATES.

Specification forming part of Letters Patent No. 163,307, dated May 18, 1875; reissue No. 6,676, dated October 5, 1875; application filed September 1, 1875.

*To all whom it may concern:*

Be it known that I, OLIVER EDWARDS, of Florence, in the county of Hampshire, in the State of Massachusetts, have invented certain Improvements in Skates, of which the following is a specification:

The object of this invention is to produce a skate that is easy on the foot of the skater, can be perfectly secured to the boot or shoe, and at the same time be durable and light; and it consists in the construction of the parts whereby the above object is attained, as will be fully hereinafter described.

Figure 1:
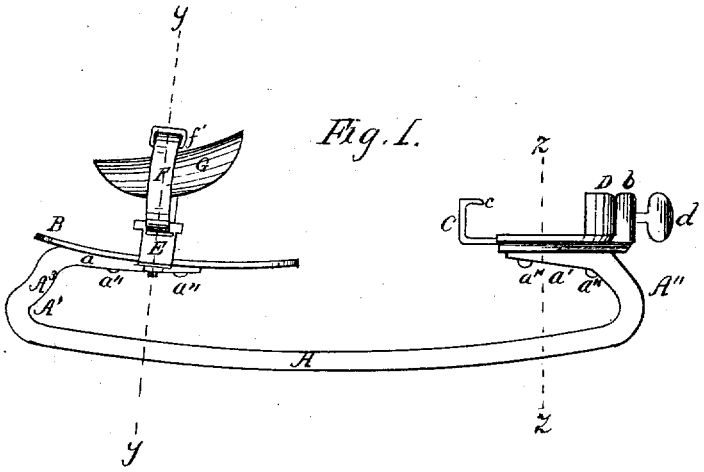
Figure 2:
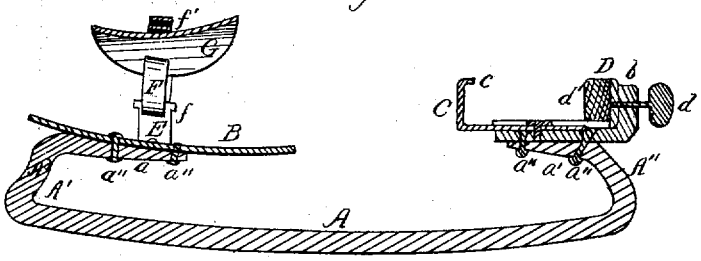
Figure 3:
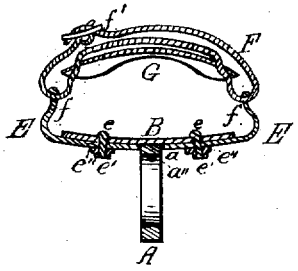
Figure 4:
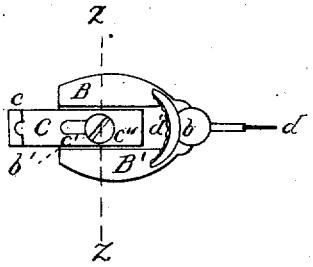
Figure 5:
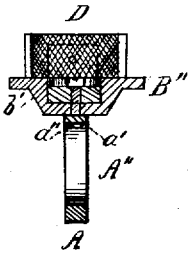

In the drawings, Figure 1 is a side view of the skate; Fig. 2, a longitudinal section of same; Fig. 3, a cross-section on line *y y;* Fig. 4, a top view of heel plate and fastenings, and Fig 5 is a vertical section on line *z z.*

A represents the runner of the skate, forming the front riser A′ and the toe-plate support *a* on its forward end, and the rear riser A″ and heel-plate support *a′* at the rear end. B is the toe-plate, and is made fast upon the part *a* of the runner A by the rivets *a″* passing through the plate and its support *a*, as seen in Figs. 1 and 2, and when riveted secures the plate surely to the support *a*. B′ is the heel-plate, riveted fast to its support *a′* by rivets *a″ a″* the same as the toe-plate. At its rear part a stud, *b*, rises vertically to give support to a clamping-screw. Longitudinally and centrally in the top of the heel-plate B′ is a parallel-sided depression, to receive an adjustable clamp to take hold of the front part of the boot or shoe heel. C is an adjustable clamp-plate, fitting and made adjustable in the depression *b′* of heel-plate B′. It is bent upward at right angles to its body at its forward end, and terminates in another right-angled bend to the rear, to form the sharp teeth *c* that take into the forward part of the boot-heel. It has a slot, *c′*, centrally in a part of its length, in which is the holding-screw *c″*, to hold it to the proper adjustment to receive the boot-heel. D is a circular and upright clamp-plate, concave on its forward side, and has sharp points or roughened surfaces *d′*, to take into the back part of the boot-heel and prevent any slipping of the heel when clamped. *d* is a clamping-screw passing through the stud *b* of the plate B′, which forms the nut for the screw *d*, and is secured to clamping-plate D, so as to freely turn therein and cause said plate to move back and forth by turning the screw *d* in the screw nut or stud *b*. By first forcing the clamp-plate D back to the stud, then adjusting the clamp-plate C to the size of the boot-heel, and putting the heel between the two parts C and D, and turning the clamping-screw to force the clamping-plate D hard against the heel, it will be securely fixed therein, and will not release its hold until the screw *d* is turned back to force the clamp D from the heel. E E are adjustable bent clamps or jaws for holding the toe of the boot upon the toe-plate of the skate. They pass under the toe-plate, and each has a slot, *e″*, therein, to receive a clamping or holding screw, *e*, so that when the clamps are at the right distance apart the nuts *e′* are turned to bear hard upon the clamps and secure them to the toe-plate, so that there will be no lateral movement of the boot or shoe between the jaws E.

As seen in Fig. 3, these clamps E are curved in their upward projection to the slot *f*, near their upper ends, when they bend at right angles out in opposite directions, and receive in slot *f* the holding-strap F, which secures the foot to the skate by the buckle *f″*, and by such construction prevents undue pressure of the strap upon the foot. G is a pad, to bear upon the foot and shield it from the pressure of strap F, which passes through the pad in openings or eyelets near each end of the pad, and then over it, leaving only the pad to bear upon top of the foot. This gives ease to the foot under the strap, and prevents the strap from binding the action of the foot in skating, and, in conjunction with the side clamps, makes the skate secure upon the foot of the skater.

The riser $A^1$, as it advances, is slightly curved at $A^3$, and inclined backward. From the top of the riser the bar or support *a* extends backward in a slightly-inclined direction, with a slight upward curve and decreased vertical thickness, and also a slightly-increased transverse width from front to rear, to form a spring-support for the foot. This riser is bent at just such an angle, and the support *a* bent and so formed in relation thereto, as that, when compressed by the weight of the skater in making fancy or toe movements, turning or balancing on the toe, the weight is carried forward toward the front end of the spring until the weight is over the riser $A^1$, which, being nearly vertical, becomes a fixed or dead point, receiving the weight directly through it, thus relieving the spring from any further pressure being applied, as a lever, to the fulcrum at the toe or dead point, and giving the full strength of a solid-riser skate, or one that has a support below the end of plate-supporter *a* and runner A.

It will be observed that the runner of the skate is narrow, and, being made of the best material, will yield some under the weight of the skater, and, being continued to form the supports of the toe and heel plates, and the toe-plate support *a* extending back and tapered at its rear end, will spring or yield considerably under the weight of the skater, which carries the incumbent weight or pressure forward over the riser at the front end of the runner, and backward the same to the rear end, making the entire runner a spring, or yielding to the weight of the skater when the greatest weight or force is put upon it, thus giving ease to the forcible strides or motions of the skater not found in a non-yielding skate, and hence a strong skate of light materials.

By this construction and arrangement a strong, light, and elastic spring-skate is not only secured, but one wherein the skater, when he throws his weight upon the toe, will be able to maintain the desired position without danger of the skate slipping or liability of breaking the spring riser or runner.

Having thus described my invention, what I claim as new, and desire to secure by Letters Patent, is—

1. A spring skate-runner, formed at its front end into a rearward-inclined riser, $A^1$, with a slight re-entering curve, $A^3$, and a curved slanting support or bar, *a*, for the foot-plate, the same being a continuation or prolongation of the runner, and of a gradual taper or decreasing vertical thickness, and slightly-increasing width from the point of the riser to the end of the support *a*, as and for the purposes described.

2. The combination of the stationary heel-plate B′, having the depression *b′* and the vertical stud *b*, with the clamp-plate D and screw *d*, substantially as described.

3. The combination of the stationary heel-plate B′, having depression *b′* and stud *b*, clamp-plate D, and screw *d*, with the adjustable jaw C, substantially as described.

4. The adjustable clamp E, when curved to receive the sole of the boot, and bent outward at the slot *f* to receive the strap F, substantially as and for the purpose described.

5. In combination with the adjustable clamp E, curved outward, and then inward, to receive the sole of the shoe, and bent outward at the slot *f*, the strap F G, for securing the front of the skate to the foot, as described.

OLIVER EDWARDS.

Witnesses:
CALVIN PORTER,
THOMAS PORTER.